No. 754,085. PATENTED MAR. 8, 1904.
M. B. NAIRN.
APPARATUS FOR THE MANUFACTURE OF MOSAIC LINOLEUM
FLOOR CLOTH OR THE LIKE.
APPLICATION FILED MAY 4, 1903.
NO MODEL. 6 SHEETS—SHEET 1.

No. 754,085. PATENTED MAR. 8, 1904.
M. B. NAIRN.
APPARATUS FOR THE MANUFACTURE OF MOSAIC LINOLEUM
FLOOR CLOTH OR THE LIKE.
APPLICATION FILED MAY 4, 1903.
NO MODEL. 6 SHEETS—SHEET 2.

No. 754,085. PATENTED MAR. 8, 1904.
M. B. NAIRN.
APPARATUS FOR THE MANUFACTURE OF MOSAIC LINOLEUM FLOOR CLOTH OR THE LIKE.
APPLICATION FILED MAY 4, 1903.
NO MODEL. 6 SHEETS—SHEET 3.

WITNESSES

INVENTOR
M. B. Nairn
by Bakewell Byrnes
his Attorneys

No. 754,085. PATENTED MAR. 8, 1904.
M. B. NAIRN.
APPARATUS FOR THE MANUFACTURE OF MOSAIC LINOLEUM
FLOOR CLOTH OR THE LIKE.
APPLICATION FILED MAY 4, 1903.
NO MODEL. 6 SHEETS—SHEET 4.

No. 754,085. PATENTED MAR. 8, 1904.
M. B. NAIRN.
APPARATUS FOR THE MANUFACTURE OF MOSAIC LINOLEUM
FLOOR CLOTH OR THE LIKE.
APPLICATION FILED MAY 4, 1903.
NO MODEL. 6 SHEETS—SHEET 5.

WITNESSES
INVENTOR

No. 754,085. PATENTED MAR. 8, 1904.
M. B. NAIRN.
APPARATUS FOR THE MANUFACTURE OF MOSAIC LINOLEUM
FLOOR CLOTH OR THE LIKE.
APPLICATION FILED MAY 4, 1903.
NO MODEL.
6 SHEETS—SHEET 6.

WITNESSES
INVENTOR

No. 754,085. Patented March 8, 1904.

UNITED STATES PATENT OFFICE.

MICHAEL B. NAIRN, OF KIRKCALDY, SCOTLAND.

APPARATUS FOR THE MANUFACTURE OF MOSAIC LINOLEUM FLOOR-CLOTH OR THE LIKE.

SPECIFICATION forming part of Letters Patent No. 754,085, dated March 8, 1904.

Application filed May 4, 1903. Serial No. 155,456. (No model.)

*To all whom it may concern:*

Be it known that I, MICHAEL BARKER NAIRN, a subject of the King of Great Britain, residing at Kirkcaldy, in the county of Fife, Scotland, have invented certain new and useful Improvements in Apparatus for the Manufacture of Mosaic Linoleum Floor-Cloth or the Like, (for which I have applied for a patent in Great Britain, dated September 29, 1902, No. 21,162,) of which the following is a specification.

My invention has for its object to enable the pattern-pieces required for the production of mosaic linoleum floor-cloth and the like to be cut out of a flat sheet of the material without requiring all the cutting-dies arranged in one and the same plane to operate simultaneously upon the entire surface of the sheet, which would require an excessive expenditure of power. For this purpose I bring a sheet of linoleum floor-cloth material underneath a series of stationary cutting-dies arranged in one and the same plane in sufficient number to cut out the whole of the pattern-pieces required to be obtained from the sheet, and I then cause a cylinder or roller corresponding in length to the width of the sheet to travel along underneath the latter in such a raised position as to raise the portion of the sheet under which it is situated for the time being and force it against and into the cutting-dies, so that these cut out the pattern-pieces therefrom in gradual succession as the roller passes from the one end to the other. In the spaces between the cutting-dies are arranged spring-disks that are pressed upward as the roller raises the sheet of material and which, after the roller has passed away, force down the waste pieces of the sheet situated between the cutting-dies, suitable means being provided for carrying such waste pieces away, after which the pattern-pieces are ejected from the dies by means of plungers in the known manner. The apparatus may be variously arranged for carrying out the said mode of operating. According to one arrangement the sheet of linoleum floor-cloth material is delivered onto a horizontal traveling carriage having at one end the said cylinder or roller that is capable of being raised and lowered. The surface of the carriage on which the sheet of material rests consists, preferably, of a series of small rollers that may receive rotary motion and between which may be flat bars, so that the sheet rests partly upon the rollers and partly upon the bars. The carriage is also provided beneath the pressing cylinder and rollers with an endless traveling apron serving to carry away the waste pieces. The pressing-roller being in the lowered position, the carriage, with its sheet of material, is run underneath the before-mentioned set of cutting-dies, and after the pressing-cylinder has been raised, so as to force the front end of the sheet of material up against and into the front row of cutting-dies, the carriage, with the cylinder, is made to travel backward underneath the sheet, which remains stationary, whereby the cylinder is made to raise successively each part of the sheet and press it into the successive rows of dies. As the roller passes away from the dies the before-mentioned spring-disks force the waste pieces from between the dies onto the traveling apron which conveys them away. When the cylinder and carriage have passed entirely from under the dies, the framing carrying these is lowered onto a table and the plungers of the dies are made to expel the pattern-pieces onto a fabric on the table forming the foundation of the mosaic floor-cloth.

With the above-described carriage may also be combined a device for lubricating the cutting-dies and plungers each time the carriage passes under them. Such device may consist of a roller dipping in a trough containing lubricating liquid and so arranged that when the carriage travels inward the said roller is raised so as to roll in contact with the dies and plungers, and thereby lubricate them, while when the carriage travels outward and the cutting-roller is in action, as described, the lubricating-roller is lowered, so as to be out of contact with the dies and material contained therein.

I will now proceed to describe the arrangement of apparatus or machinery which I prefer to employ in carrying my said invention into practice.

Figure 1 of the accompanying drawings shows a general side elevation, and Fig. 2 a plan of the machine adapted for the production of mosaic floor-cloth with any required number of different-colored tesseræ.

Figure 1:
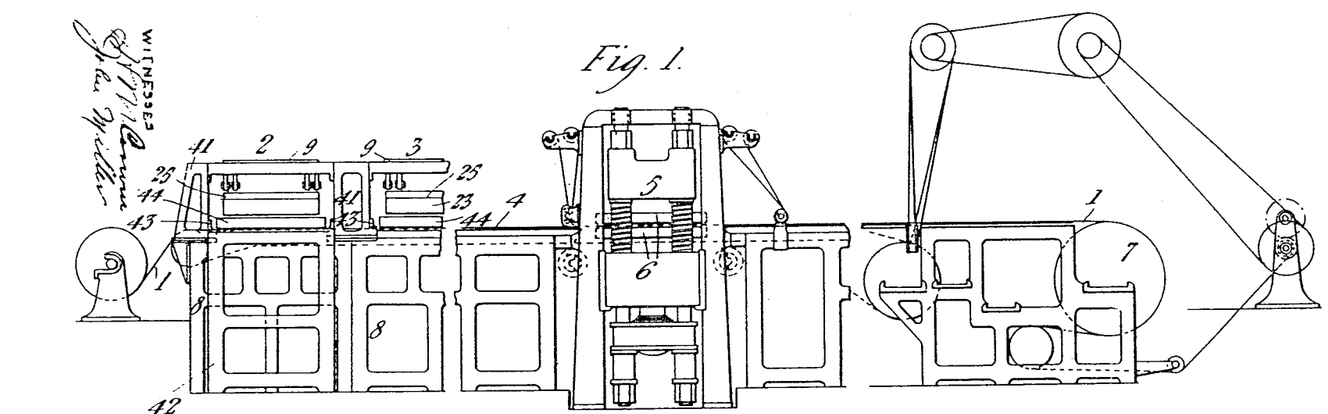
Figure 2:
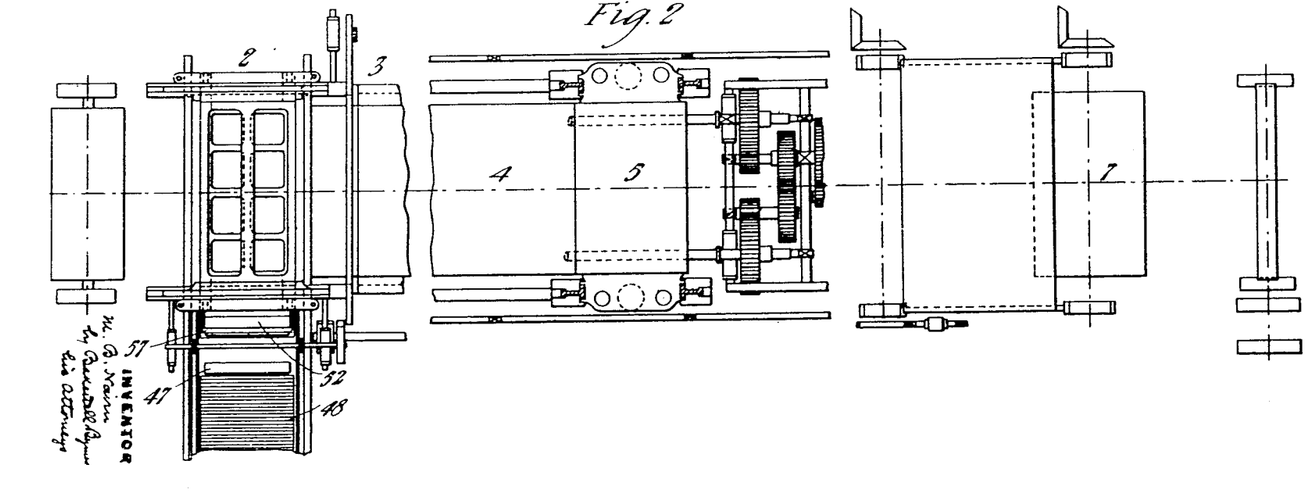
Figure 3:
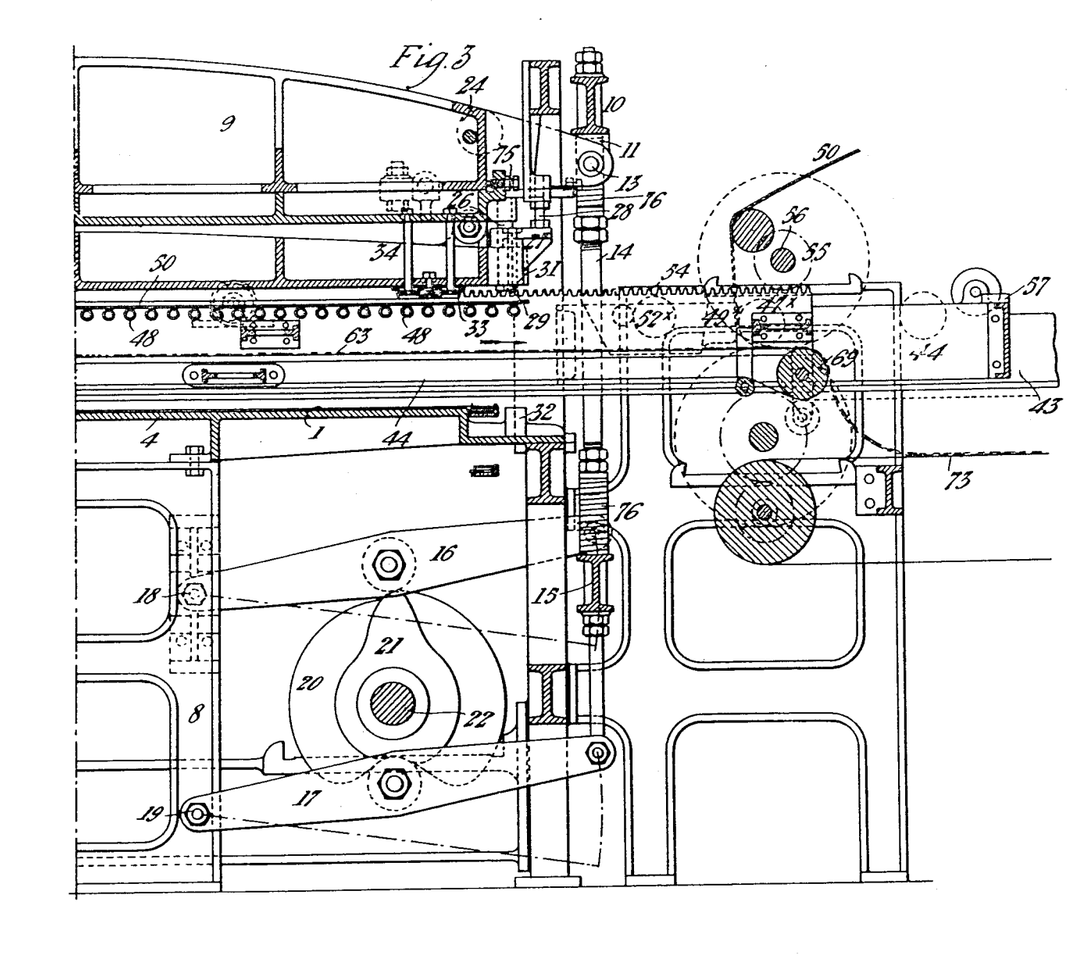
Figs. 3 and 3× together show a transverse section of one of the cutting-out and depositing machines.
Figure 4:
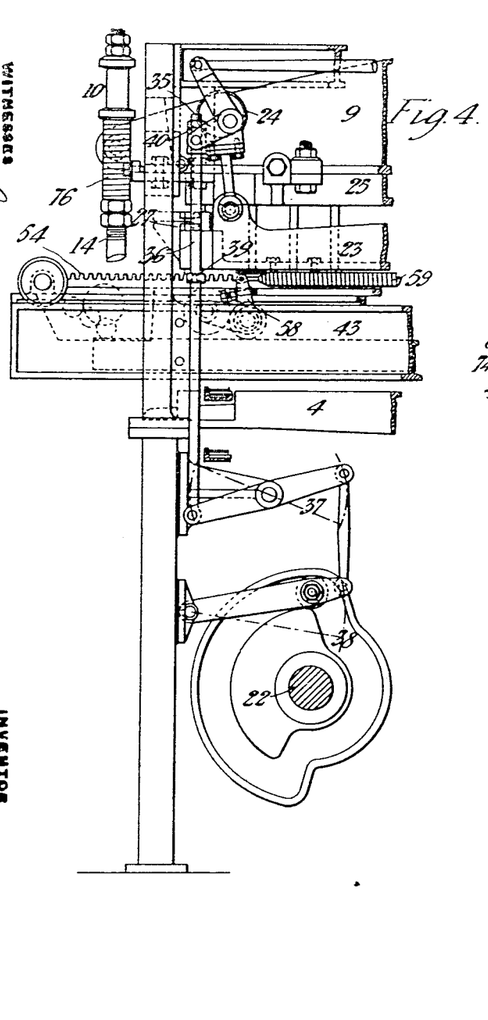
Fig. 4, a part side view.
Figure 5:
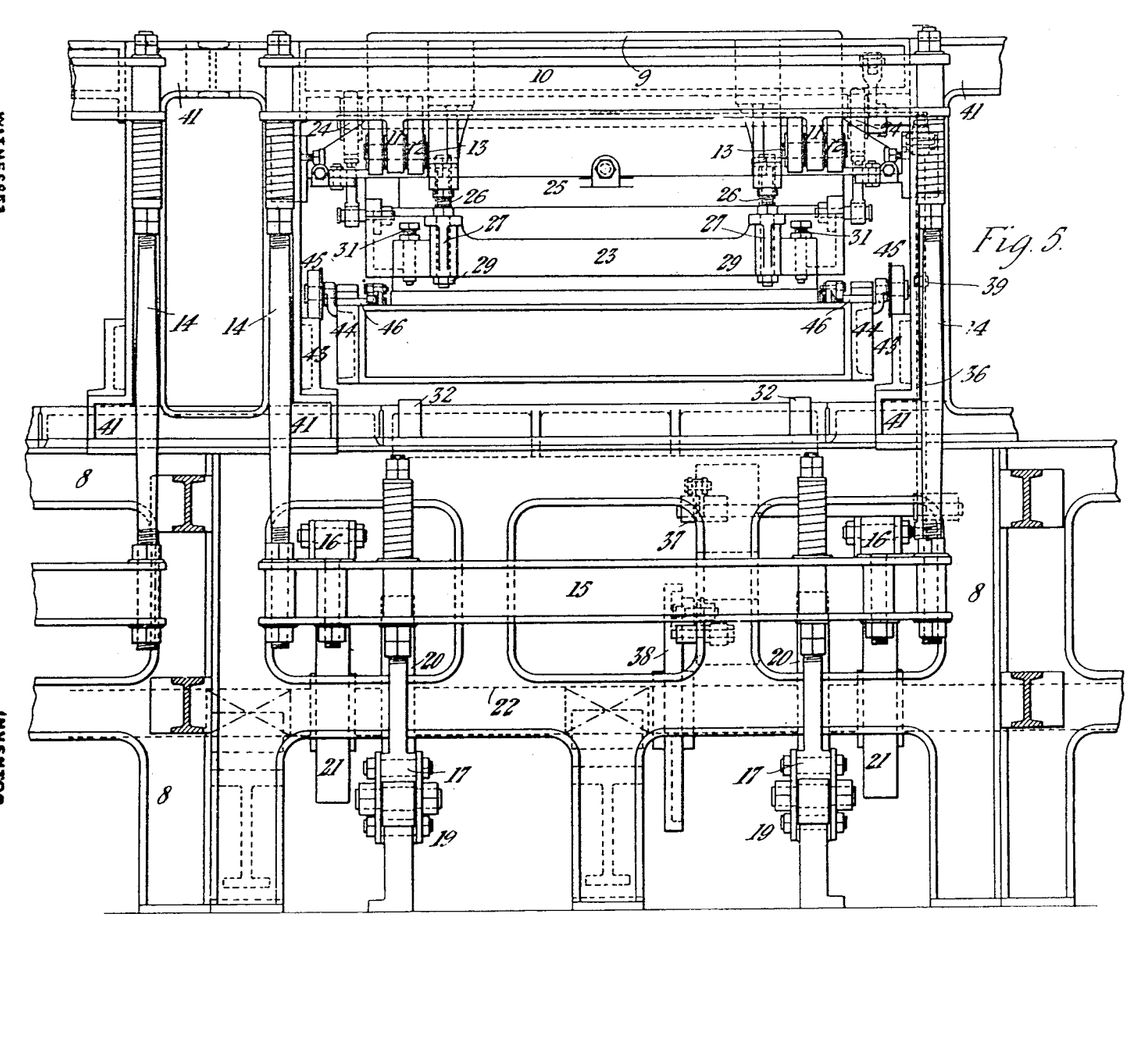
Fig. 5, an end view.

As shown at Figs. 1 and 2, there are as many cutting-out and depositing machines arranged side by side as there are different-colored tesseræ for forming the pattern, through which machines passes consecutively the canvas base-cloth 1, on which the cut tesseræ are deposited and fixed, so that after this has received the tesseræ of one color from machine 2 it passes onto machine 3, where it receives the tesseræ of another color in proper position relatively to those first deposited, and so on, the base-cloth being made to travel along a table 4 by a step-by-step motion, remaining stationary at each machine while the whole of the tesseræ thereof are being deposited. After the base-cloth has been completely filled in this manner, thus constituting a sheet of inlaid linoleum, it passes into a hydraulic press 5, where it is subjected to pressure, while at the same time it is heated by a heating-chest 6, so as to bind the whole effectually together. From the hydraulic press the finished mosaic floor-cloth finally passes to the forwarding apparatus 7, consisting of a cylinder with clamp rotated by the gearing shown, so as to impart to the floor-cloth the required step-by-step forward motion, the extent of each successive travel being the exact amount required for bringing the base-cloth into position in the cutting and depositing machines—that is to say, a length equal to the width of a machine. The cylinder 7 is driven by gear of any suitable known arrangement for fulfilling the above object. The construction and action of the said machines for cutting out and depositing the tesseræ is as follows: Between two strong side frames 8, connected by transverse rails, is mounted a beam or cross-head 9, carried at its ends by transverse bearers 10 to lugs 11, on which it is attached by brackets 12 and bolts 13, the bearers 10 being in their turn supported by vertical rods 14, whose lower ends are fixed to a cross-bar 15, to which are pivoted levers 16 17, turning on fulcra at 18 19 and actuated by cams 20 21, fixed on driving-shafts 22, by which consequently the cross-head 9 receives a vertical up-and-down motion at intervals, as will be presently described. Below the cross-head 9 is, first, a lower platen 23, connected thereto by the rods of eccentrics 24, mounted on the cross-head, and, secondly, an upper platen 25, bolted to the cross-head and carrying four guide-bolts 26, passing through brackets 27 on platen 23 and serving to guide the latter when being moved relatively to 25 by the eccentrics 24, such motion being limited by adjustable upper stops 28 on the framing and lower stops 29 on the ends of bolts 26. The cross-head 9 and platens 23 25 are shown in their highest position in Figs. 3, 3×, 4, and 5, in which the cutting-dies 30, fixed to the lower platen, are in position for cutting the tesseræ out of the linoleum sheet, the brackets 27 of platen 23 being then in contact with the upper stops 28. When the cross-head and platens are brought to the lowest position by the cams 20 21, as at Fig. 7, the platen 23 rests with adjustable stop 31 upon abutment-pieces 32 on the table carrying the base-cloth 1, in which position the lower edges of the dies 30 are sufficiently clear of the base-cloth to allow the cut tesseræ to be deposited from the former onto the latter. This is effected by means of plungers 33, contained within the die, which are connected to the upper platen 25 by rods 34. These are so arranged that when the dies are in the raised position (shown at Figs. 3, 3×) ready for cutting the plungers are in the inward position shown; but when the cross-head and platens are lowered the motion of platen 23 being arrested when it comes in contact with the abutments 32, the cross-head and platen 25, in continuing to descend, cause the plungers to descend in the dies and in pushing the cut tesseræ out of them onto the base-cloth to assume the position shown at Fig. 7. The before-mentioned eccentrics 24 carry an arm 35, with a sleeve which slides up and down a rod 36 during the up-and-down motion of the cross-head and platens, which rod is pivoted to a parallel motion 37, actuated by a cam 38 on the driving-shaft 22. When the parts are in the lowered position described, cam 38 is made to push up rod 36, so that its stop 39 in acting upon arm 35 turns the eccentrics 24 slightly beyond their top dead-centers, whereby platen 23 is slightly raised relatively to 25, causing the plungers 33 to be brought flush with or slightly protruded beyond the cutting-dies 30, and the cross-head and platens are then made to rise into the upper position, but with the plungers protruding, as described, in which position the dies and plungers are oiled by a device to be presently described. When this has been done, the cams 20 21 impart a slight farther upward motion to the cross-head and upper platen, (the lower platen being held stationary by the stops 28,) and at the same time cam 38 acts upon rod 36 so as to cause the stop 40 to draw down arm 35, and thus turn back the eccentrics into their original position, thereby allowing platen 23 to assume the position relatively to 25 shown at Figs. 3, 3×, in which the plungers are drawn inward in the dies, and these are then ready for the next cutting operation.

I will now describe the essential feature of my invention—namely, the manner in which a traveling roller is made to press a sheet of linoleum successively against the cutting-dies 30 for cutting out the tesseræ therefrom.

To brackets 41, fixed to the side frames of the machine and to frames 42, are fixed horizontal rails 43, extending through the machine at right angles to the table 4, carrying the base-cloth 1, and upon these rails runs a carriage consisting of two separate parts—namely, an outside part 44, which runs with wheels 45 upon the said rails, and an inside part 46, which is adapted to slide to a certain extent to and fro between stops on the outside part while this is stationary, as will be presently described. The inside part carries, first, the cutting-roller 47, that serves to press the linoleum against the cutting-dies; secondly, a series of small rollers 48, that serve to support the sheet of linoleum upon the carriage, and, thirdly, an endless traveling cloth 63, that serves to carry away the waste portions of the linoleum sheet as this is operated upon by the dies 30. The outer carriage 44 carries, first, a bar 49, acting both as a stop for the roller 47 of the inner carriage to butt against when moving from right to left and for nipping the end of a linoleum sheet 50 between it and roller 47 during the inward travel of the combined carriage; secondly, the outer carriage carries an oiling-trough 51 with oiling-roller 52, that effects the oiling of the cutting-dies 30 and plungers during the inward travel of the carriage. The under side of the outer carriage is inclosed by sheet-iron 53 to prevent any oil or waste linoleum dropping onto the table below carrying the base-cloth. On the upper edges of the inner carriage are fixed toothed racks 54, with which gear pinions 55 on the driving-shaft 56, which has an intermittent rotary motion imparted to it, such as to run the carriage into and out of the machine and then to remain stationary while the cut tesseræ are being deposited on the base-cloth. It will be seen that when the pinions 55 begin to run the carriage into the machine they first impart motion to the inner part only until the cutting-roller 47 comes in contact with the nipping-bar 49, thereby nipping the end of the linoleum sheet 50 between them, after which both parts travel inward together. On starting the outward motion, on the other hand, the inner part moves on the outer part until the end of the former comes in contact with stops 57 on the rear end of the latter, when both parts travel together. The cutting-roller 47 is mounted upon pivoted arms 58, which are acted upon by springs 59, which tend to raise the arms and roller into the position shown at Fig. 6, that being the position in which the roller presses the linoleum sheet against the cutting-dies. When, however, the inner carriage is made to commence its inward motion, as above described, tapered extensions 58× of 58 in engaging with rollers at the under side of the nipping-bar 49, draw the arms, and with them the roller, down into the lowered position, (shown in Fig. 3×,) and in this position the roller then passes with the carriage underneath the cutting-dies. The oiling-roller 52 is also carried by pivoted arms 60 in the oil-trough 51, fixed to the outer carriage. When the inner carriage commences its inward motion, as described, inclines 61 thereon pass under studs projecting from the arms 60, and thereby raise these and the roller into such a position that on both parts of the carriage then performing the inward motion the oiling-roller comes in contact with the under surfaces of the cutting-dies and the protruding plungers and effects the oiling of these. The arms 60 are made double with spring action, as shown, so as effectually to press the roller against the plungers.

Figures 6, 7, 8:
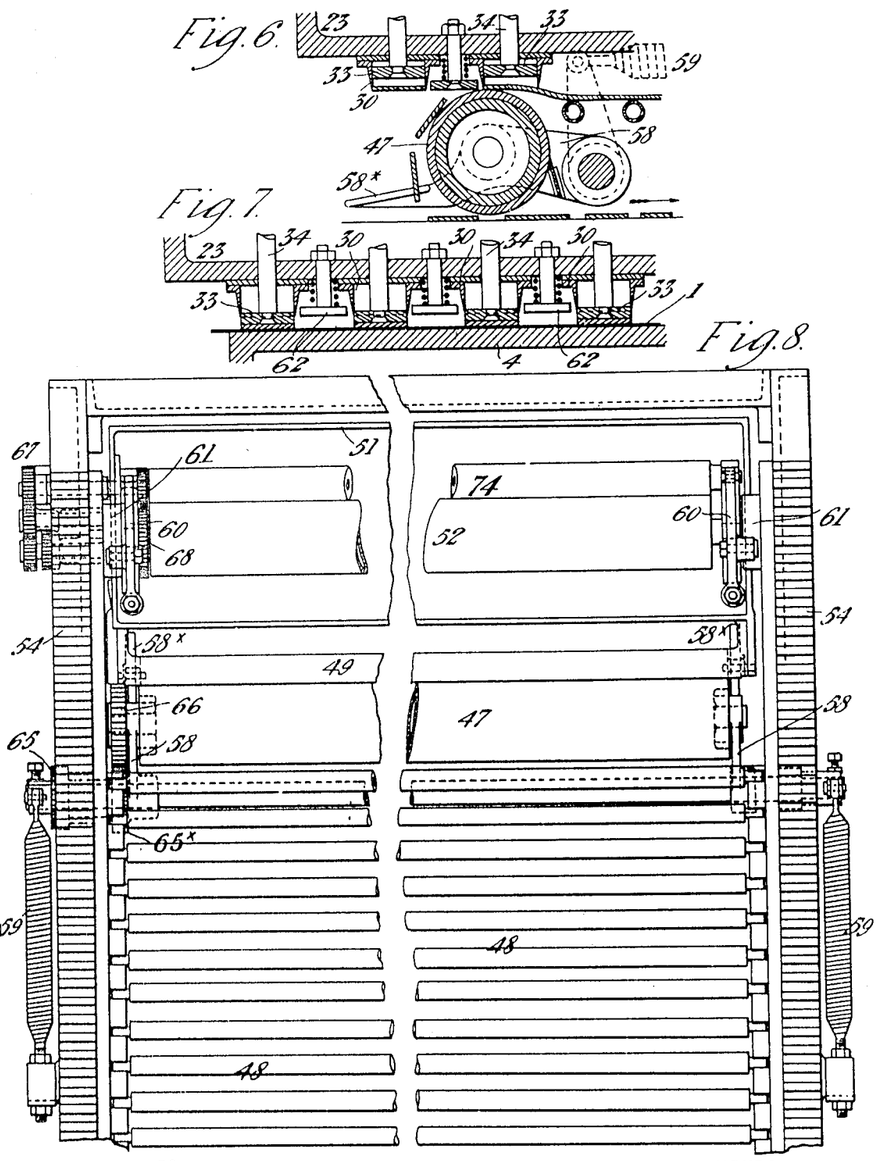
Fig. 6, a part cross-section showing the cutting-roller in action.
Fig. 7, a part cross-section showing the parts in position for depositing the tesseræ on the base-cloth.
Fig. 8, a part plan of the carriage.

The action of the above-described machine is as follows: In commencing operations the carriage is in the outward position, (indicated in dotted lines at Fig. 3,) the cutting-roller being situated at 47×, the nipping-bar at 49×, and the oiling-roller at 52×. In this position a sheet of linoleum 50 is fed onto the carriage in any convenient manner so as to lie upon the small rollers 48, the front edge thereof being brought round the cutting-roller, so that when the forward motion of the inner carriage begins the linoleum is nipped between the roller and the nipping-bar. The combined carriages then travel forward, the oiling-roller being raised and the cutting-roller lowered, as already described. As the carriage passes along under the cutters these and the plungers are oiled by the roller 52. On the completion of the inward motion the carriage and parts connected thereto are in the position shown at Figs. 3 and 3×. Immediately afterward the before-described completion of the motion of the cross-head and platens is effected, whereby the plungers are drawn back into the cutting-dies, as shown, these being now ready to commence the cutting operation. The carriage then commences its outward travel, when as the outer carriage at first remains stationary the inclines 61 are withdrawn from the arms of the oiling-roller, so that this drops down into the trough. Also the extensions of the arms carrying the cutting-roller being withdrawn from the nipping-bar the roller is raised up by its springs 59, so that on the continued outward motion of the carriage the roller raises up the linoleum sheet and presses it against the cutting-dies, as shown at Fig. 6. The first row of cutting-dies 30 are thus made to cut out of the linoleum sheet tesseræ of a configuration corresponding to that of the cutters, which tesseræ remains in the cutters, while the waste portions of the sheet surrounding the latter are pushed downward from between them by means of spring-plates 62, carried by palten 23, (which have previously been pressed upward by the roller,) and fall down in the space between roller 47 and bar 49 upon the endless traveling cloth 63, carried by the inner carriage and made to travel in the direction of the arrow, Figs. 3, 3×, and 6, so as to carry the waste material away as it falls down. As the carriage proceeds outward the cutting-roller 52 presses the linoleum sheet against the second row of dies, and so on successively until the whole of the sheet has had the tesseræ cut out of it, and the carriage eventually arrives at its original outward position with the cutting-roller and oiling-roller situated in the positions 47× and 52×. The carriage now remains stationary, while the previously-described operations of lowering the cross-head and platens with the cutting-dies, pushing the tesseræ out of the latter down onto the base-cloth 1, raising the cross-head platens and dies again, and slightly protruding the plungers 33 have been completed and the base-cloth 1 has been fed forward, so as to bring another section under the dies. After this the carriage again travels forward, receiving a fresh sheet of linoleum and bringing it under the cutters.

Figure 9:
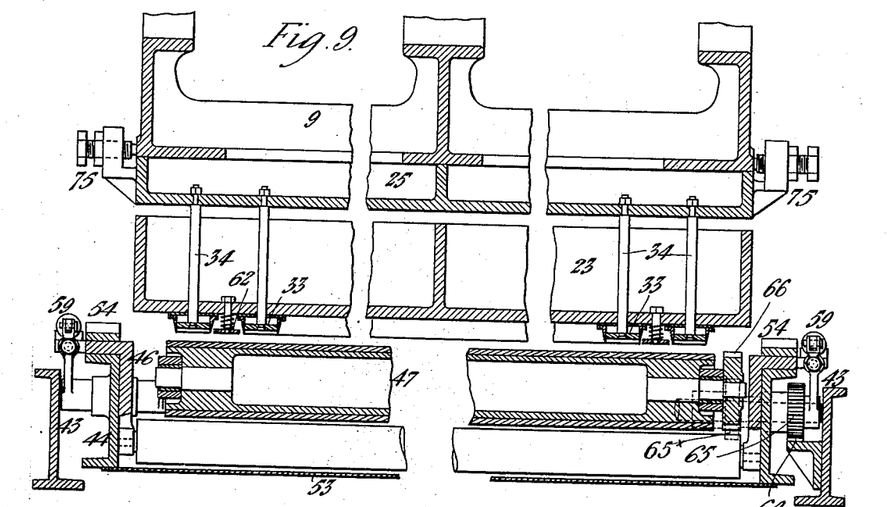
Fig. 9, a longitudinal section through the cutting-roller.
Figure 10:
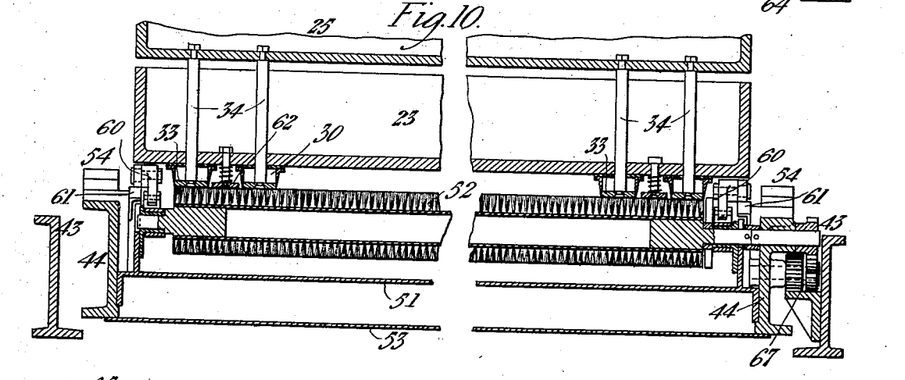
Fig. 10, a longitudinal section through the oiling-trough.
Figure 11:
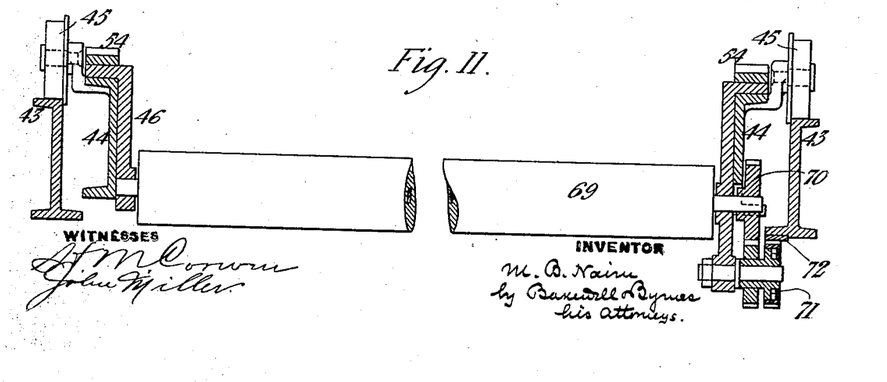
Fig. 11, a longitudinal section showing the driving-roller of the conveying-cloth.

The cutting-roller has rotary motion imparted to it during its cutting operation, as follows: The rail 43, fixed to bracket 41 of the framing 8, carries a toothed rack 64, with which gears a pinion 65, mounted loose on the axis of the arms 58, carrying the cutting-roller. The extended boss of pinion 65 carries a second pinion 65×, which gears with a pinion 66 on the axis of the cutting-roller, so that as the carriage travels the pinion 65 is rotated by the rack and imparts rotation to the cutting-roller. The same racks 64 also impart rotation to the oiling-roller 52 by a train of pinions 67, one of which is in gear with the rack, while another on the axis of the arms 60 is in gear with a toothed wheel 68 on the roller-axis. The traveling cloth 63 has its motion imparted to it through the outer end roller 69, whose axis carries a toothed wheel 70, gearing with a double pinion 71, which also gears with a rack 72 on the under side of the rail 43, carried by the brackets 41. A second traveling cloth is provided at 73 for receiving the waste material from the cloth 63 and carrying it to the end of the frame when the carriage is in the inward position. The cutting-roller is provided with a suitable soft resilient surface, as shown at Fig. 9, so that the cutting-dies can embed themselves sufficiently into it to insure their effectual penetration through the linoleum sheet for separating the tesseræ therefrom. It is provided with a suitable scraper or doctor-blade for removing any adhering material therefrom. The oiling-roller 52 is provided with a doctor-roller 74 for removing surplus oil therefrom.

The upper platen is capable of accurate adjustment in a horizontal direction relatively to the cross-head by means of adjusting-screws 75. The connecting-rods for imparting the up-and-down motion to the cross-head and platens are provided with spring-adjustments 76 for affording a smooth motion.

The driving-gear for the several mechanisms for imparting the above-described different kinds of motion may be of any suitable kind, such as shown on the drawings, and may be easily devised by any one conversant with the art. It is therefore not necessary to further describe the same.

In conclusion I will for the sake of clearness shortly restate the sequence of operations performed by the above-described machinery in carrying out my said invention: First, the cross-head, platens, and dies are in the raised position, with the plungers flush with the face of the cutters; secondly, a section of the base-cloth has been brought into the machine for receiving the cut tesseræ; thirdly, the carriage with the cutting-roller and oiling-roller being in the outward position receives a sheet of linoleum and is run into the machine, effecting the oiling of the cutters and plungers; fourthly, a relative motion is then effected between the cross-head with upper platen and the lower platen, whereby the plungers are made to recede into the dies; fifthly, the carriage with the cutting-roller in the raised position and the oiling-roller lowered is then run outward, whereby the cutting-roller forces the linoleum into the cutters; sixthly, during this operation the spring-plates eject the waste linoleum from between the cutters onto the conveying-cloth; seventhly, when the carriage has completed its outward travel it remains stationary and the cross-head, platens, and cutters descend to the base-cloth, onto which the tesseræ are deposited by the plungers; eighthly, the cross-head, &c., then rise again into the raised position and the plungers and cutters are ready for oiling; ninthly, a fresh section of the base-cloth is run into the machine, and the operations 3 to 8 are then repeated.

Having thus described the nature of this invention and the best means I know of carrying the same into practical effect, I claim—

1. In machinery for the manufacture of mosaic linoleum floor-cloth, a plurality of hollow cutting-dies whose cutting edges all lie in one and the same plane, and a roller adapted to travel along underneath said cutting-dies so as to press an interposed sheet of linoleum consecutively against and into them, substantially as described.

2. In machinery for the manufacture of mosaic linoleum floor-cloth, a plurality of hollow cutting-dies having their cutting edges all lying in one and the same plane, a carriage having a backward and forward motion to and from the dies and adapted to bring a sheet of linoleum underneath said dies, a roller on said carriage, means for raising said roller when the carriage with the linoleum is at the end of its forward motion under the cutting-dies, so as to press the linoleum sheet progressively against and into the dies as the carriage and roller travel from under the dies, means for removing the waste portions of the linoleum from between the dies, and means for ejecting the cut tesseræ out of the dies and depositing them upon a base-cloth, substantially as described.

3. In machinery for the manufacture of mosaic linoleum floor-cloth, a plurality of hollow cutting-dies whose cutting edges all lie in the same plane, a carriage having a backward and forward motion to and from the dies, a cutting-roller mounted on pivoted arms on said carriage, springs adapted to bring the roller into a raised position, means for holding the roller in a lowered position while the carriage is traveling forward underneath the dies, and for releasing it when the carriage begins to travel backward so as to allow the cutting-roller to rise and press a sheet of linoleum successively against the dies during the backward travel, means for pressing the waste portions of linoleum from between the dies and onto a traveling cloth on the carriage adapted to convey such portions away, a base-cloth adapted to travel along a table beneath said carrier, means for lowering the cutting-dies into close proximity to the base-cloth after the carriage has passed from under them, means for depositing the cut tesseræ from the dies onto the base-cloth, and means for raising the dies again after such deposit has been effected, substantially as described.

4. In machinery for the manufacture of mosaic linoleum floor-cloth, a plurality of hollow cutting-dies whose cutting edges all lie in the same plane, a carriage having a backward and forward motion to and from the dies, a cutting-roller mounted on pivoted arms on said carriage, springs adapted to bring the roller into a raised position, means for holding the roller in a lowered position while the carriage is traveling forward underneath the dies, and for releasing it when the carriage begins to travel backward so as to allow the cutting-roller to rise and press a sheet of linoleum successively against the dies during the backward travel, an oiling-roller situated on the carriage in front of said cutting-roller, means for holding said oiling-roller in a raised position while the carriage is traveling forward, so as to bring the roller in contact with the cutting-dies and their plungers, and means for lowering the oiling-roller when the carriage begins its backward travel, substantially as described.

5. In machinery for the manufacture of mosaic linoleum floor-cloth, a plurality of hollow cutting-dies whose cutting edges all lie in the same plane, a carriage adapted to travel backward and forward to and from said dies which consists of an outer and an inner part capable of a certain amount of longitudinal motion relatively to each other, of which the inner part carries first a cutting-roller adapted to be lowered during the forward travel of the carriage and to be raised during the backward motion thereof; secondly, a series of small rollers adapted to receive a sheet of linoleum to be operated upon by the cutting-roller and cutting-dies, and, thirdly, an endless traveling cloth adapted to receive and carry away the waste portions of the linoleum sheet after it has been operated upon, while the outer part of the carriage carries a nipping-bar for nipping the linoleum sheet between it and the cutting-roller, and an oil-trough containing an oiling-roller adapted to be raised in contact with the cutting-dies and their plungers while the carriage is performing its forward travel and to be lowered out of such contact while the carriage performs its outward travel, substantially as described.

6. In machinery for the manufacture of mosaic linoleum floor-cloth, a cross-head adapted to receive a vertical to-and-fro motion with intervening periods of rest, an upper platen adjustably fixed to the cross-head, a lower platen carried by eccentrics on the cross-head so as to be capable of a certain vertical motion relatively thereto hollow cutting-dies fixed to the under side of the lower platen and adapted to cut tesseræ from a sheet of linoleum pressed against them, plungers in said dies having stems attached to the upper platen, so that when on the downward motion of the cross-head and platens the lower platen butts against stops, the upper platen, in descending still further causes the plungers to move downward in the dies and to deposit the tesseræ onto a base-cloth below substantially as described.

7. In machinery for the manufacture of mosaic linoleum floor-cloth, a cross-head adapted to receive a vertical to-and-fro motion with intervening periods of rest, an upper platen adjustably fixed to the cross-head, a lower platen carried by the cross-head and upper platen so as to be capable of a certain vertical motion relatively thereto, hollow cutting-dies fixed to the under side of the lower platen and adapted to cut tesseræ from a sheet of linoleum pressed against them, plungers in said dies having stems attached to the upper platen, eccentrics on the cross-head, whose straps are connected to the lower platen, and means for turning said eccentrics when the cross-head and platens are in the raised position so as to move the lower platen upward relatively to the upper platen to such an extent as to cause 5 the plungers to protrude from the dies, substantially as described.

In testimony whereof I have hereunto set my hand in presence of two subscribing witnesses.

MICHAEL B. NAIRN.

Witnesses:
HUGH B. BARR,
ALEX. A. BENNETT.